Patented Apr. 25, 1933

1,905,290

UNITED STATES PATENT OFFICE

GEORGE FREDERICK HORSLEY, OF NORTON-ON-TEES, ENGLAND, ASSIGNOR TO IMPERIAL CHEMICAL INDUSTRIES LIMITED, OF LONDON, ENGLAND, A BRITISH COMPANY

PRODUCTION OF ALDOL

No Drawing. Application filed January 29, 1929, Serial No. 336,016, and in Great Britain February 6, 1928.

This invention relates to the production of aldol and crotonaldehyde starting from acetaldehyde. It is known to condense acetaldehyde in the presence of alkali both at low and at raised temperatures, e. g. 30–40° C. Various sources of alkali have been proposed, and in various concentrations. Thus it has been proposed to effect the condensation of acetaldehyde to aldol by means of potassium carbonate solution used in a concentration equal to a 0.4 normal solution: it has also been proposed to use 0.1 normal caustic soda solution. A saturated solution of baryta has also been recommended. It has also been proposed to use a limited quantity of dilute aqueous solution of caustic alkali so that the amount of caustic alkali present in the reaction mixture is not more than about 0.02 per cent. of the quantity of acetaldehyde.

It is also known to carry out the reaction in the medium formed by aldol and acetaldehyde, and to perform the condensation and distillation of the products while excluding oxygen.

According to the present invention the condensation of acetaldehyde to aldol is carried out while excluding oxygen in neutral or very faintly alkaline solution such that the concentration of hydroxyl ions is not greater than one hundred-thousandth normal. The smallest degree of alkalinity that has hitherto been suggested, namely an amount of alkali equal to 0.02 per cent of the acetaldehyde, is several hundred times the maximum permitted according to this invention. According to another feature of the invention the solution is buffered for example by addition of a metal acetate such as sodium acetate which may or may not act as a condensing agent preferably in conjunction with an amount of acetic acid sufficient to depress the concentration of hydroxyl ions to the neutral point or to within the limits already indicated.

The presence of acetate ions in the solution minimizes the effect of an accidental increase in the acetic acid concentration that might be occasioned by oxidation of the acetaldehyde if oxygen should find its way into the solution. The reaction is preferably carried out at moderately raised temperatures, e. g. 30° C.

Example

In a continuous small-scale plant, 52 kilogrammes of liquid acetaldehyde were introduced daily into a reaction vessel containing a reaction medium composed of 40 parts of aldol, 40 parts of acetaldehyde and 20 parts of water, and containing 3 grammes per litre of sodium acetate and a trace of acetic acid corresponding to a concentration of 0.0001 normal. The contents of the reaction vessel were maintained at a temperature of 30° by means of cooling coils, and a stream of inert gas was continuously passed over the surface of the reaction liquor. 13 kilogrammes per day of a 1 per cent. aqueous solution of sodium acetate were added to the reaction liquor, and from time to time a test was taken on the liquor. If it was no longer neutral (pH=7) either acid or alkali was added to adjust the balance.

The necessary amount of reaction liquor was continuously withdrawn to keep a constant quantity present in the vessel, and this withdrawn liquor was acidified by the addition of 0.4 kilogrammes per day of 20 per cent. sulphuric acid. The liquor was then distilled, the acetaldehyde vapors given off being returned to the reaction vessel, and the aldol being converted into crotonaldehyde and water. The crotonaldehyde distilled off in the form of a binary azeotropic vapor with water, containing 74 per cent. of crotonaldehyde and 26 per cent of water.

This vapor on condensation separated into two layers, the upper one being rich in crotonaldehyde and the lower one rich in water. By distilling the liquid forming the upper layer a further quantity of binary vapor was evolved, which was condensed and added to the previous condensate, and pure crotonaldehyde was obtained from the residue. The aqueous layer on distillation yielded a quantity of binary vapor and a residue of water which was rejected.

I declare that what I claim is:—

1. Process of producing aldol which consists in condensing acetaldehyde in neutral solution, while excluding oxygen.

2. A process of producing aldol which consists in condensing acetaldehyde in a buffered neutral solution.

3. Process of producing aldol which consists in condensing acetaldehyde in presence of an alkali metal acetate.

4. Process of producing aldol which consists in condensing acetaldehyde in presence of an acetate and sufficient acetic acid to neutralize the hydroxyl ions formed by hydrolysis of the said acetate.

5. Process of producing aldol which consists in condensing acetaldehyde in absence of oxygen and in presence of an acetate and sufficient acetic acid to neutralize the hydroxyl ions formed by hydrolysis of the said acetate.

6. In the process of producing aldol, the step which comprises condensing acetaldehyde in the presence of a solution having a hydroxyl ion concentration of from $10^{-7}$ to $10^{-5}$ normal.

7. In the process of producing aldol, the step which comprises condensing acetaldehyde in the presence of a solution having a hydroxyl ion concentration of from $10^{-7}$ to $10^{-5}$ normal in the presence of a buffer salt.

8. In the process of producing aldol, the step which comprises condensing acetaldehyde in the presence of a solution having a hydroxyl ion concentration of from $10^{-7}$ to $10^{-5}$ normal in the presence of a buffer salt, and an amount of acetic acid sufficient to maintain the concentration of hydroxyl ions within the limits indicated.

In witness whereof, I have hereunto signed my name this 11th day of January, 1929.

GEORGE FREDERICK HORSLEY.